United States Patent
Kaneko et al.

(10) Patent No.: US 8,088,865 B2
(45) Date of Patent: Jan. 3, 2012

(54) METHOD FOR PRODUCING RESIN COMPOSITION

(75) Inventors: Kazuyoshi Kaneko, Ichihara (JP); Toshiyuki Hirose, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 618 days.

(21) Appl. No.: 11/660,307

(22) PCT Filed: Aug. 29, 2005

(86) PCT No.: PCT/JP2005/015613
§ 371 (c)(1), (2), (4) Date: Feb. 15, 2007

(87) PCT Pub. No.: WO2006/025293
PCT Pub. Date: Mar. 9, 2006

(65) Prior Publication Data
US 2007/0155903 A1     Jul. 5, 2007

(30) Foreign Application Priority Data
Aug. 30, 2004   (JP) ................ 2004-249604

(51) Int. Cl.
C08F 8/00    (2006.01)
C08L 9/00    (2006.01)
C08L 23/00   (2006.01)
C08L 45/00   (2006.01)

(52) U.S. Cl. ......... 525/191; 525/210; 525/232; 525/240

(58) Field of Classification Search .............. 525/191, 525/210, 232, 240
See application file for complete search history.

(56) References Cited

U.S. PATENT DOCUMENTS

| 4,166,083 A | * | 8/1979 | Ueda et al. ............ 524/518 |
| 4,992,511 A | | 2/1991 | Yamamoto et al. |
| 5,414,044 A | * | 5/1995 | Moriya et al. .......... 525/74 |
| 6,331,591 B1 | | 12/2001 | Miyamoto et al. |
| 2007/0255030 A1 | * | 11/2007 | Sakamoto et al. ....... 526/201 |

FOREIGN PATENT DOCUMENTS

| JP | 2-167318 A | 6/1990 |
| JP | 4-170452 A | 6/1992 |
| JP | 04-170453 A | 6/1992 |
| JP | 9-176397 A | 7/1997 |
| JP | 11-21413 A | 1/1999 |
| JP | 2002-69202 A | 3/2002 |

* cited by examiner

*Primary Examiner* — Nathan M Nutter
(74) *Attorney, Agent, or Firm* — Buchanan Ingersoll & Rooney PC

(57) ABSTRACT

Provided is a method for producing a resin composition by melt-kneading a cyclic olefin polymer (A) having a glass transition temperature of from 60 to 200° C. and a flexible polymer (B) having a glass transition temperature of 0° C. or lower, wherein a part of the cyclic olefin polymer (A) is previously melt-kneaded with the flexible polymer (B) and a radical initiator (C) and then the remaining cyclic olefin polymer (A) is added thereto and melt-kneaded. The cyclic olefin polymer (A) is divided into two portions and added separately at two times, and accordingly, the mixture having a crosslinked structure may be diluted with the cyclic olefin polymer (A) not having a crosslinked structure, and the increase in the melt viscosity of the resin composition may be thereby prevented. A composition having good abrasion resistance and good melt shapability can be obtained.

16 Claims, No Drawings

METHOD FOR PRODUCING RESIN COMPOSITION

TECHNICAL FIELD

The present invention relates to a method for producing a resin composition, in particular to a method for producing a resin composition comprising melt-kneading a cyclic olefin polymer, a flexible polymer and a radical initiator. In addition, the invention also relates to a method for producing a shaped article by injection-molding such a resin composition.

BACKGROUND ART

A cyclic olefin polymer has good chemical resistance, heat resistance and weather resistance, and its shaped article has good dimensional accuracy and good rigidity, and therefore it has many applications for various shaped articles. For the purpose of improving the impact resistance thereof, a flexible polymer may be blended with a cyclic olefin polymer.

Patent Reference 1 describes a crosslinked impact-resistant cyclic olefin resin composition comprising a reaction product of a cyclic olefin random copolymer comprising an ethylene component and a cyclic olefin component and having a softening temperature not lower than 70° C., a flexible copolymer having a glass transition temperature of not higher than 0° C., and an organic peroxide. Patent Reference 1 says that the resin composition has good impact strength, especially good low-temperature impact resistance, but says nothing relating to abrasion resistance thereof.

Patent Reference 1: JP-A 2-167318 (Claims, Effect of the Invention)

DISCLOSURE OF THE INVENTION

Problems that the Invention is to Solve

As the resin composition described in Patent Reference 1 is crosslinked, the increase in its melt viscosity is inevitable, and therefore its use is often difficult when a molding method that requires high-level melt flowability is employed. For example, in injection molding at high speed, or in injection molding to give large-size articles, or in injection molding to give articles that require severe dimensional accuracy, good shaped articles could not be obtained from the resin composition.

The present invention has been made for the purpose of solving the above problems, and its object is to provide a method for producing a resin composition having good abrasion resistance and melt shapability. Its object is also to provide a method for producing a shaped article by injection-molding the resin composition.

Means for Solving the Problems

The above-mentioned problems are solved by providing a method for producing a resin composition by melt-kneading a cyclic olefin polymer (A) having a glass transition temperature of from 60 to 200° C. and a flexible polymer (B) having a glass transition temperature of 0° C. or lower, wherein a part of the cyclic olefin polymer (A) is previously melt-kneaded with the flexible polymer (B) and a radical initiator (C) and then the remaining cyclic olefin polymer (A) is added thereto and melt-kneaded.

Preferably, the cyclic olefin polymer (A) is a polymer prepared by polymerizing a cyclic olefin of the following formula [I] or [II]. Also preferably, the cyclic olefin polymer (A) is a random copolymer of ethylene and a cyclic olefin of the following formula [I] or [II]. Also preferably, MFR (as measured at 230° C. and under a load of 2.16 kg according to ASTM D1238) of the cyclic olefin polymer (A) is from 0.1 to 500 g/10 min.

[Chemical 1]

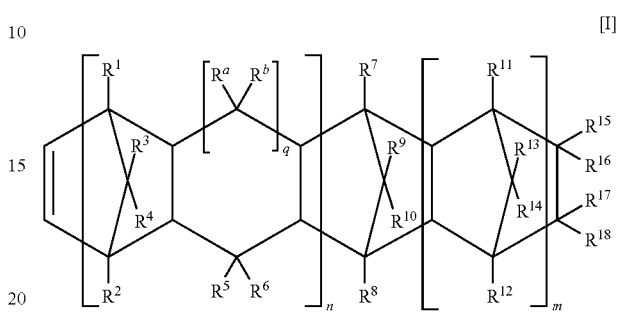

[I]

(In formula [I], n indicates 0 or 1; m indicates 0 or a positive integer; q indicates 0 or 1; $R^1$ to $R^{18}$ and $R^a$ and $R^b$ each independently represent a hydrogen atom, a halogen atom or a hydrocarbon group; $R^{15}$ to $R^{18}$ may bond to each other to form a monocyclic or polycyclic structure, and the monocyclic or polycyclic structure may have a double bond; and $R^{15}$ and $R^{16}$, or $R^{17}$ and $R^{18}$ may form an alkylidene group.)

[Chemical 2]

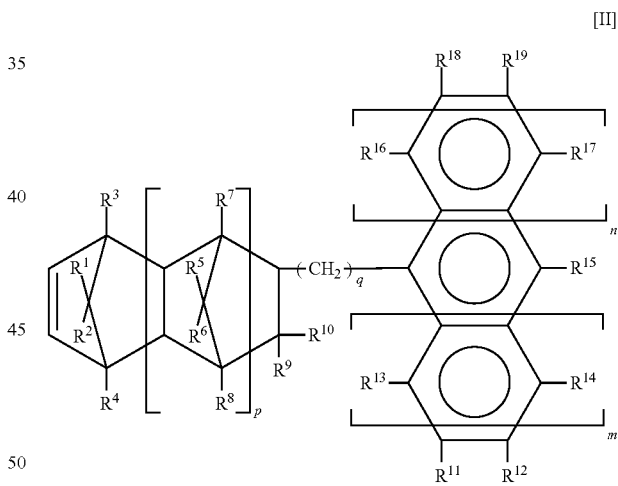

[II]

(In formula [II], p and q each indicate 0 or an integer of 1 or more; m and n each indicate 0, 1 or 2; $R^1$ to $R^{19}$ each independently represent a hydrogen atom, a halogen atom, an aliphatic hydrocarbon group, an alicyclic hydrocarbon group, an aromatic hydrocarbon group, or an alkoxy group; the carbon atom to which $R^9$ (or $R^{10}$) bonds, and the carbon atom to which $R^{13}$ or $R^{11}$, bonds may bond to each other directly or via an alkylene group having from 1 to 3 carbon atoms; and when n=m=0, $R^{15}$ and $R^{12}$, or $R^{15}$ and $R^{19}$ may bond to each other to form a monocyclic or polycyclic aromatic ring.)

Preferably, the flexible polymer (B) is a flexible copolymer (b) prepared by polymerizing at least two monomers selected from a group consisting of olefins, dienes and aromatic vinyl-hydrocarbons, and having a glass transition temperature of 0° C. or lower. More preferably, the flexible copolymer (b) is at least one copolymer selected from a group consisting of: an amorphous or low-crystalline flexible copolymer (b1) prepared by polymerizing at least two monomers selected from a group consisting of ethylene and an α-olefin having from 3 to 20 carbon atoms, a flexible copolymer (b2) prepared by polymerizing ethylene, an α-olefin having from 3 to 20 carbon atoms, and a cyclic olefin, a flexible copolymer (b3) prepared by polymerizing a non-conjugated diene, and at least two monomers selected from ethylene and an α-olefin having from 3 to 20 carbon atoms, and a flexible copolymer (b4) of a random or block copolymer or its hydrogenation product of an aromatic vinyl-hydrocarbon and a conjugated diene. Even more preferably, the flexible copolymer (b) is an amorphous or low-crystalline flexible copolymer (b1) prepared by polymerizing at least two monomers selected from a group consisting of ethylene and an α-olefin having from 3 to 20 carbon atoms.

Preferably in the production method, 100 parts by weight of a cyclic olefin polymer (A), from 1 to 150 parts by weight of a flexible polymer (B) and from 0.001 to 1 part by weight of a radical initiator (C) are melt-kneaded. Preferably in this, the ratio of the amount of the cyclic olefin polymer (A) to be added previously to the amount thereof to be added later (previous addition/later addition) is from 1/99 to 70/30. Also preferably, a part of a cyclic polymer (A) and a flexible polymer (B) are previously melt-kneaded, then a radical initiator (C) is added thereto and melt-kneaded, and subsequently the remaining cyclic olefin polymer (A) is added thereto and melt-kneaded.

One preferred embodiment of the invention comprises adding a polyfunctional compound (D) having at least two radical-polymerizable functional groups in the molecule, along with the radical initiator (C). Preferably in this, from 0.001 to 1 part by weight of such a polyfunctional compound (D) is melt-kneaded with 100 parts by weight of a cyclic olefin polymer (A).

Preferably, the melt-kneading temperature is from 150 to 350° C. Also preferably, the melt-kneading is attained in an extruder having a vent. Also preferably, the kneading time after the addition of the radical initiator (C) is from 30 to 1800 seconds. Also preferably, MFR (as measured at 230° C. and under a load of 2.16 kg according to ASTM D1238) of the resin composition is from 0.01 to 100 g/10 min. A method of producing a shaped article by injection-molding the resin composition produced according to the above-mentioned production method is also a preferred embodiment of the invention.

Effect of the Invention

The production method of the invention gives a resin composition having good abrasion resistance and melt shapability. The resin composition is favorably used in producing shaped articles, especially injection-molded articles that require high-level melt flowability and in addition require good abrasion resistance.

BEST MODE FOR CARRYING OUT THE INVENTION

The production method of the invention is for producing a resin composition by melt-kneading a cyclic olefin polymer (A) having a glass transition temperature of from 60 to 200° C. and a flexible polymer (B) having a glass transition temperature of 0° C. or lower, wherein a part of the cyclic olefin polymer (A) is previously melt-kneaded with the flexible polymer (B) and a radical initiator (C) and then the remaining cyclic olefin polymer (A) is added thereto and melt-kneaded.

The cyclic olefin polymer (A) has good heat resistance, thermal aging resistance, chemical resistance, weather resistance, solvent resistance, dielectric characteristics and rigidity; and owing to such characteristics thereof, it is used in many applications. A method is known of adding the flexible polymer (B) to the cyclic olefin polymer (A) for improving the impact resistance thereof. However, the fact has not been sufficiently recognized as yet that the abrasion resistance of the cyclic olefin polymer (A) is unsatisfactory and it could not be significantly improved even by addition of the flexible polymer (B) thereto. The level of the necessary properties of shaped plastic articles is being higher these days, and the resins for them are often required to have high-level abrasion resistance. However, owing to its poor abrasion resistance, the cyclic olefin polymer (A) or its mixture with the flexible polymer (B) alone is impracticable in some cases.

It has already been known that a resin composition prepared by melt-kneading the cyclic olefin polymer (A) and the flexible polymer (B) in the presence of a radical initiator (C) to thereby introduce a crosslinked structure thereinto may have improved low-temperature impact resistance. This time the resin composition is tested for its abrasion resistance, and it has become clear that the composition has good abrasion resistance. It may be considered that, when the cyclic olefin polymer (A) and the flexible polymer (B) are melt-kneaded at a temperature at which the radical initiator (C) decomposes, then the two may undergo crosslinking reaction to give a resin composition having good abrasion resistance.

However, when the cyclic olefin polymer (A), the flexible polymer (B) and the radical initiator (C) are melt-kneaded, then the melt viscosity of the resulting resin composition may inevitably increase owing to the crosslinking reaction occurring between them. Accordingly, in case where a molding method that requires high-level melt flowability is employed for the composition, there may occur a problem. For example, in injection molding at high speed, or in injection molding to give large-size articles, or in injection molding to give articles that require severe dimensional accuracy, good shaped articles could not be obtained from the composition.

To solve the problem, the cyclic olefin polymer (A) is divided into two portions and added separately at two times in the invention. Specifically, a part of the cyclic olefin polymer (A), the flexible polymer (B) and the radical initiator (C) are previously melt-kneaded and then the remaining cyclic olefin polymer (A) is added thereto and melt-kneaded. Accordingly, the mixture of the cyclic olefin polymer (A) having a crosslinked structure and the flexible polymer (B) may be diluted with the cyclic olefin polymer (A) not having a crosslinked structure, and the increase in the melt viscosity of the resin composition may be thereby prevented. Surprisingly, the abrasion resistance of the resin composition obtained according to the production method can be fully improved. Accordingly, a composition having both good abrasion resistance and good melt shapability can be obtained.

The cyclic olefin polymer (A) for use in the invention has a glass transition temperature of from 60 to 200° C. For satisfying the heat resistance for the shaped article, the glass transition temperature of the polymer must be 60° C. or higher, preferably 80° C. or higher, more preferably 100° C. or higher. If, however, the molding temperature is too high, then the polymer may decompose, and therefore, the glass transition temperature of the polymer must be 200° C. or lower. The glass transition temperature as referred to herein is a glass transition-starting temperature measured with a differential scanning colorimeter at a heating speed of 10° C./min.

Preferably, MFR (melt flow rate, as measured at 230° C. and under a load of 2.16 kg according to ASTM D1238) of the cyclic olefin polymer (A) is from 0.1 to 500 g/10 min. If MFR is lower than 0.1 g/10 min, then the melt viscosity of the polymer is too high and the melt moldability of the resulting resin composition may worsen. More preferably, MFR is at least 0.5 g/10 min, even more preferably at least 1 g/10 min. On the other hand, if MFR is larger than 500 g/10 min, then the mechanical strength of the resulting resin composition may lower. More preferably, MFR is at most 200 g/10 min, even more preferably at most 100 g/10 min.

The cyclic olefin polymer (A) may be any one prepared through polymerization of an aliphatic cyclic skeleton-having olefin monomer to give an aliphatic cyclic skeleton-having polymer, and its type is not specifically defined. Preferably, however, the cyclic olefin polymer (A) is a polymer prepared through polymerization of a cyclic olefin of the following formula [I] or [II]:

[Chemical 3]

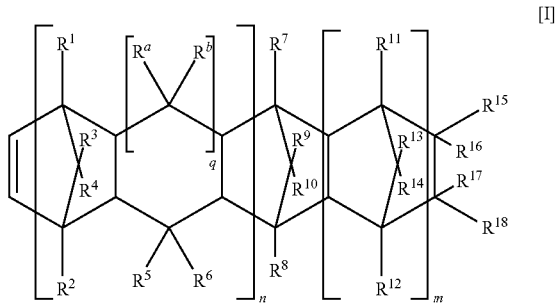

[I]

(In formula [I], n indicates 0 or 1; m indicates 0 or a positive integer; q indicates 0 or 1; $R^1$ to $R^{18}$ and $R^a$ and $R^b$ each independently represent a hydrogen atom, a halogen atom or a hydrocarbon group; $R^{15}$ to $R^{18}$ may bond to each other to form a monocyclic or polycyclic structure, and the monocyclic or polycyclic structure may have a double bond; and $R^{15}$ and $R^{16}$, or $R^{17}$ and $R^{18}$ may form an alkylidene group.)

[Chemical 4]

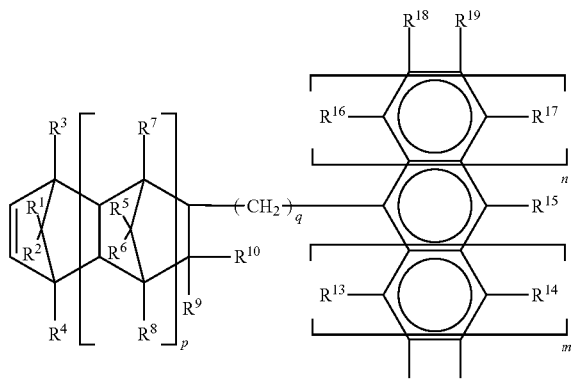

[II]

(In formula [II], p and q each indicate 0 or an integer of 1 or more; m and n each indicate 0, 1 or 2; $R^1$ to $R^{19}$ each independently represent a hydrogen atom, a halogen atom, an aliphatic hydrocarbon group, an alicyclic hydrocarbon group, an aromatic hydrocarbon group, or an alkoxy group; the carbon atom to which $R^9$ (or $R^{10}$) bonds, and the carbon atom to which $R^{13}$ or $R^{11}$ bonds may bond to each other directly or via an alkylene group having from 1 to 3 carbon atoms; and when n=m=0, $R^{15}$ and $R^{12}$, or $R^{15}$ and $R^{19}$ may bond to each other to form a monocyclic or polycyclic aromatic ring.)

Preferred examples of the polymer prepared by polymerizing the cyclic olefin of formula [I] or [II] are (a1), (a2), (a3) and (a4) mentioned below.

(a1): Random copolymer of ethylene and a cyclic olefin of formula [I] or [II] (ethylene-cyclic olefin random copolymer).

(a2): Ring-opening polymer or ring-opening copolymer of a cyclic olefin of formula [I] or [II].

(a3): Hydrogenation product of (a2).

(a4): Graft-modification product of (a1), (a2) or (a3).

The cyclic olefin of formula [I] or [II] to form the cyclic olefin polymer (A) for use in the invention is described.

The chemical formula of the cyclic olefin [I] is as follows:

[Chemical 5]

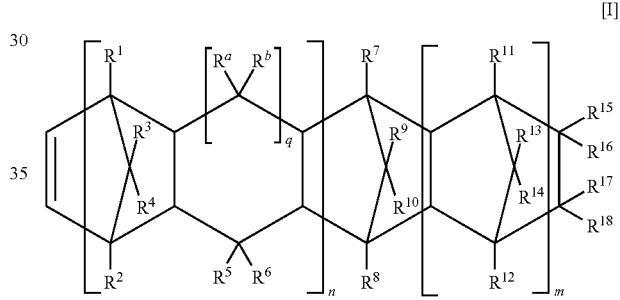

[I]

In formula [I], n indicates 0 or 1; m indicates 0 or a positive integer; q indicates 0 or 1. When q is 1, then $R^a$ and $R^b$ each independently represent an atom or a hydrocarbon group mentioned below; and when q is 0, then the dangling bonds bond to each other to form a 5-membered ring.

$R^1$ to $R^{18}$ and $R^a$ and $R^b$ each independently represent a hydrogen atom, a halogen atom or a hydrocarbon group. The halogen atom is a fluorine atom, a chlorine atom, a bromine atom or an iodine atom.

The hydrocarbon group is independently and generally an alkyl group having from 1 to 20 carbon atoms, a cycloalkyl group having from 3 to 15 carbon atoms, or an aromatic hydrocarbon group. More concretely, the alkyl group includes a methyl group, an ethyl group, a propyl group, an isopropyl group, an amyl group, a hexyl group, an octyl group, a decyl group, a dodecyl group and an octadecyl group; the cycloalkyl group includes a cyclohexyl group; and the aromatic hydrocarbon group includes a phenyl group and a naphthyl group.

The hydrocarbon group may be substituted with a halogen atom. In formula [I], $R^{15}$ to $R^{18}$ may bond to each other (or together) to form a monocyclic or polycyclic structure, and the cyclic or polycyclic structure thus formed may have a double bond. Concrete examples of the monocyclic or polycyclic structure to be formed herein are mentioned below.

[Chemical 6]

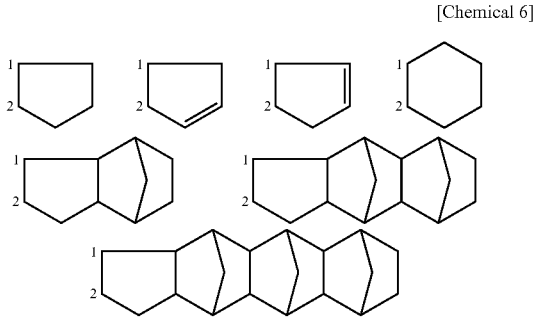

In the above examples, the carbon atom with a number 1 or 2 is a carbon atom in formula [I] to which $R^{15}$ ($R^{16}$) or $R^{17}$ ($R^{18}$) bonds. $R^{15}$ and $R^{16}$, or $R^{17}$ and $R^{18}$ may form an alkylidene group. The alkylidene group is generally an alkylidene group having from 2 to 20 carbon atoms, and its specific examples are an ethylidene group, a propylidene group and an isopropylidene group.

The chemical formula of the cyclic olefin [II] is mentioned below.

[Chemical 7]

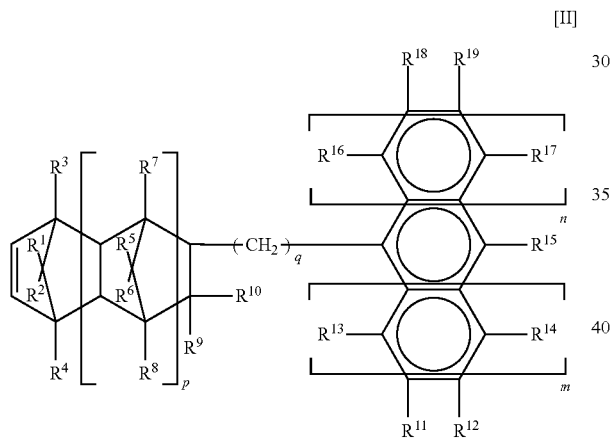

[II]

In formula [II], p and q each indicate 0 or a positive integer; m and n each indicate 0, 1 or 2. $R^1$ to $R^{19}$ each independently represent a hydrogen atom, a halogen atom, a hydrocarbon group or an alkoxy group.

The halogen atom has the same meaning as that in formula [I]. The hydrocarbon group each independently includes an alkyl group having from 1 to 20 carbon atoms, a halogenoalkyl group having from 1 to 20 carbon atoms, a cycloalkyl group or an aromatic hydrocarbon group having from 3 to 15 carbon atoms. More concretely, the alkyl group includes a methyl group, an ethyl group, a propyl group, an isopropyl group, an amyl group, a hexyl group, an octyl group, a decyl group, a dodecyl group and an octadecyl group; the cycloalkyl group includes a cyclohexyl group; and the aromatic hydrocarbon group includes an aryl group and an aralkyl group, concretely a phenyl group, a tolyl group, a naphthyl group, a benzyl group and a phenylethyl group.

The alkoxy group includes a methoxy group, an ethoxy group and a propoxy group. These hydrocarbon group and alkoxy group may be substituted with a fluorine atom, a chlorine atom, a bromine atom or an iodine atom.

The carbon atom to which $R^9$ and $R^{10}$ bond, and the carbon atom to which $R^{13}$ bonds or the carbon atom to which $R^{11}$ bonds may bond to each other directly or via an alkylene group having from 1 to 3 carbon atoms. Specifically, when the above two carbon atoms bond to each other via an alkylene group, then the groups represented by $R^9$ and $R^{13}$, or the groups represented by $R^{10}$ and $R^{11}$ together form a methylene group (—$CH_2$—), an ethylene group (—$CH_2CH_2$—) or a propylene group (—$CH_2CH_2CH_2$—).

When n=m=0, then $R^{15}$ and $R^{12}$, or $R^{15}$ and $R^{19}$ may bond to each other to form a monocyclic or polycyclic aromatic ring. The monocyclic or polycyclic aromatic ring in the case includes, for example, the groups mentioned below in which $R^{15}$ and $R^{12}$ form an aromatic ring when n=m=0.

[Chemical 8]

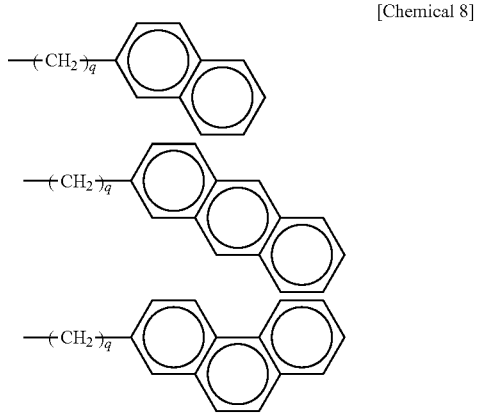

q has the same meaning as that in formula [II].

More concrete examples of the cyclic olefins of formula [I] or [II] are shown below. First mentioned are bicyclo[2.2.1]-2-heptene (=norbornene) (in the above-mentioned general formula, the numbers of 1 to 7 each indicate the carbon position number therein), and derivatives of the compound substituted with a hydrocarbon group.

[Chemical 9]

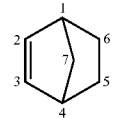

Examples of the hydrocarbon group are 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenyl), 5-(β-naphthyl), 5-(α-naphthyl), 5-(anthracenyl), 5,6-diphenyl.

As examples of other derivatives, further mentioned are cyclopentadiene-acenaphthylene adduct, and bicyclo[2.2.1]-2-heptene derivatives such as 1,4-methano-1,4,4a,9a-tetrahydrofluorenone, 1,4-methano-1,4,4a,5,10,10a-hexahydroanthracene.

In addition, also mentioned are tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene, 5-methyltricyclo[4.3.0.1$^{2,5}$]-3-decene; tricyclo[4.4.0.1$^{2,5}$]-3-undecene derivatives such as tricyclo[4.4.0.1$^{2,5}$]-3-undecene, 10-methyltricyclo[4.4.0.1$^{2,5}$]-3-undecene.

Also mentioned are tetracyclo[4.4.0.1$^{2,5}$.1$^{7,10}$]-3-dodecene represented by the following structural formula, and its derivatives substituted with a hydrocarbon group.

[Chemical 10]

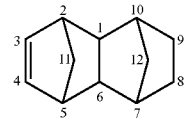

Examples of the hydrocarbon group are 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro-, 8-bromo, 8-fluoro, 8,9-dichloro, 8-phenyl, 8-methyl-8-phenyl, 9-benzyl, 8-tolyl, 8-(ethylphenyl), 8-(isopropylphenyl), 8,9-diphenyl, 8-(biphenyl), 8-(β-naphthyl), 8-(α-naphthyl), 8-(anthracenyl), 5,6-diphenyl.

Further mentioned are tetracyclo[4.4.0.1$^{2,5}$.1$^{7,10}$]-3-dodecene derivatives such as adduct of (cyclopentadiene-acenaphthylene adduct) and cyclopentadiene; pentacyclo[6.5.1.1$^{3,6}$.0$^{2,7}$.0$^{9,13}$]-4-pentadecene and its derivatives, pentacyclo[7.4.0.1$^{2,5}$.1$^{9,12}$.0$^{8,13}$]-3-pentadecene and its derivatives, pentacyclo[8.4.0.1$^{2,5}$.1$^{9,12}$.0$^{8,13}$]-3-hexadecene and its derivatives, pentacyclo[6.6.1.1$^{3,6}$.0$^{2,7}$.0$^{9,14}$]-4-hexadecene and its derivatives, hexacyclo[6.6.1.1$^{3,6}$.1$^{10,13}$.0$^{2,7}$.0$^{9,14}$]-4-heptadecene and its derivatives, heptacyclo[8.7.0.1$^{2,9}$.1$^{4,7}$.1$^{11,17}$.0$^{3,8}$.0$^{12,16}$]-5-eicosene and its derivatives, heptacyclo[8.7.0.1$^{3,6}$.1$^{10,17}$,1$^{12,15}$.0$^{2,7}$.0$^{11,16}$]-4-eicosene and its derivatives, heptacyclo[8.8.0.1$^{2,9}$.1$^{4,7}$.1$^{11,18}$.0$^{3,8}$.0$^{12,17}$]-5-heneicosene and its derivatives, octacyclo[8.8.0.1$^{2,9}$.1$^{4,7}$.1$^{11,18}$.1$^{13,16}$.0$^{3,8}$.0$^{12,17}$]-5-docosene and its derivatives, nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene and its derivatives.

Examples of the cyclic olefin of formula [I] or [II] usable in the invention are mentioned above, and more concrete structures of these compounds are shown in JP-A 7-145213, paragraphs [0032] to [0054], which are usable as the cyclic olefin in the invention.

The cyclic olefin of formula [I] or [II] mentioned above may be produced through Diels-Alder reaction of cyclopentadiene and an olefin having the corresponding structure.

One or more types of these cyclic olefins may be used herein either singly or as combined. Preferably using the cyclic olefin of formula [I] or [II] mentioned above, the cyclic olefin polymer (A) for use in the invention may be produced, for example, according to the methods described in JP-A 60-168708, JP-A 61-120816, JP-A61-115912, JP-A61-115916, JP-A61-271308, JP-A 61-272216, JP-A 62-252406, JP-A 62-252407 with suitably selecting the condition for the production.

(a1): Ethylene/Cyclic Olefin Random Copolymer:

In the ethylene/cyclic olefin random copolymer (a1), the constitutional unit derived from ethylene and the constitutional unit derived from the cyclic olefin as above bond to each other in random configuration, therefore having a substantially linear structure. The substantially linear structure of the copolymer not having a substantially gel-like crosslinked structure is confirmed by the fact that, when the copolymer dissolves in an organic solvent, the resulting solution contains no insoluble. For example, when the intrinsic viscosity [η] thereof is measured, the copolymer completely dissolves in decalin at 135° C., and this confirms the above.

In the ethylene/cyclic olefin random copolymer (a1) for use in the invention, at least a part of the cyclic olefin of formula [I] or [II] may constitute a repeating unit of the following formula [III] or [IV].

[Chemical 11]

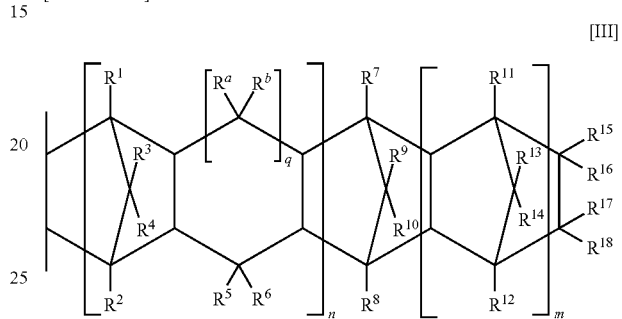

[III]

In formula [III], n, m, q, R$^1$ to R$^{18}$, R$^a$ and R$^b$ have the same meanings as in formula [I].

[Chemical 12]

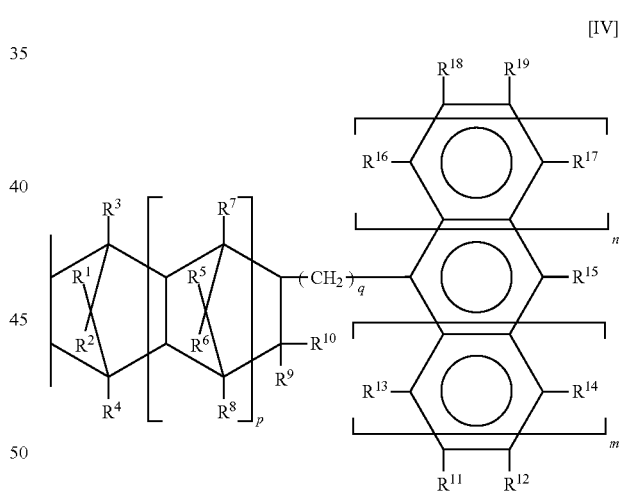

[IV]

In formula [IV], n, m, p, q, and R$^1$ to R$^{19}$ have the same meanings as in formula [II]. Without detracting from the object of the invention, the ethylene/cyclic olefin random copolymer (a1) for use in the invention may optionally have a constitutional unit derived from any other copolymerizable monomer.

The other monomers may be olefins except ethylene and cyclic olefins mentioned above, concretely including α-olefins having from 3 to 20 carbon atoms such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-otcadecene and 1-eicosene; cyclo-olefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene; and non-conjugated dienes such as 1,4-hexadiene, 4-methyl-1,4-hexadiene, 5-methyl-1,4-hexadiene, 1,7-octadiene, dicyclopentadiene and 5-vinyl-2-norbornene.

These other monomers may be used herein either singly or as combined. In the ethylene/cyclic olefin random copolymer (a1), the constitutional unit derived from the other monomer as above may be generally in an amount of at most 20 mol %, preferably at most 10 mol %.

The ethylene/cyclic olefin random copolymer (a1) for use in the invention may be produced according to the production methods disclosed in the above-mentioned patent publications, using ethylene and a cyclic olefin of formula [I] or [II]. Of those, preferred is a method of producing the ethylene/cyclic olefin random copolymer (a1) through copolymerization in a hydrocarbon solvent using a catalyst formed from a vanadium compound and an organoaluminium compound soluble in the hydrocarbon solvent.

For the copolymerization, also usable is a solid Group 4 metallocene catalyst. The solid Group 4 metallocene catalyst is a catalyst comprising a transition metal compound that contains a cyclopentadienyl skeleton-having ligand, an organoaluminiumoxy compound, and optionally an organoaluminium compound. The transition metal belonging to the Group 4 of the Periodic Table is zirconium, titanium or hafnium, and the transition metal has at least one cyclopentadienyl skeleton-containing ligand. Examples of the cyclopentadienyl skeleton-containing ligand are a cyclopentadienyl group, an indenyl group, a tetrahydroindenyl group and a fluorenyl group optionally substituted with an alkyl group. These groups may bond to the compound via any other group such as an alkylene group. Other ligands than the cyclopentadienyl skeleton-containing ligand are an alkyl group, a cycloalkyl group, an aryl group and an aralkyl group and so on.

The organoaluminiumoxy group and the organoaluminium compound may be those generally used in producing olefin resins. The solid Group 4 metallocene catalyst is described, for example, in JP-A 61-221206, JP-A 64-106, JP-A 2-173112.

(a2): Ring-Opening Polymer or Ring-Opening Copolymer of Cyclic Olefin:

In the ring-opening polymer or ring-opening copolymer of cyclic olefin, at least a part of the cyclic olefin of formula [I] or [II] may constitute a repeating unit of the following formula [V] or [VI]:

[Chemical 13]

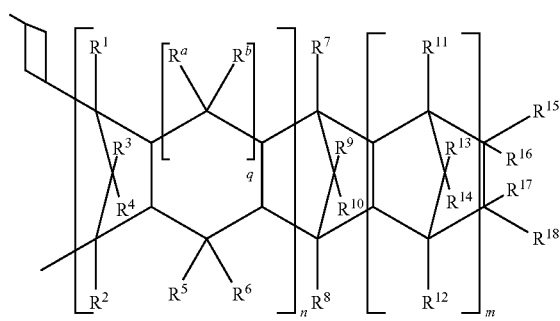

[V]

In formula [V], n, m, q, $R^1$ to $R^{18}$, $R^a$ and $R^b$ have the same meanings as in formula [I].

[Chemical 14]

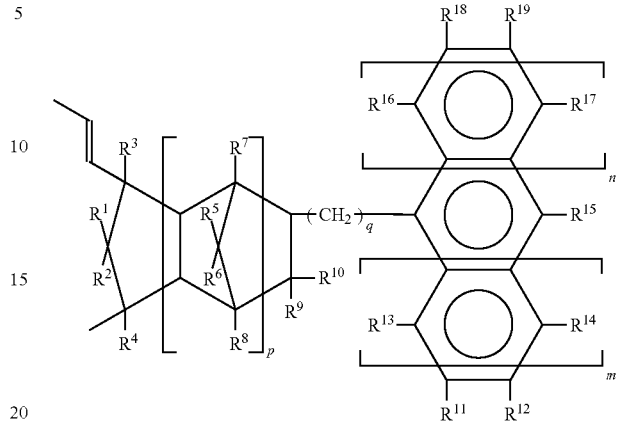

[VI]

In formula [VI], n, m, p, q, and $R^1$ to $R^{19}$ have the same meanings as in formula [II]. The ring-opening polymer or the ring-opening copolymer may be produced according to the production methods disclosed in the above-mentioned patent publications. For example, a cyclic olefin of formula [I] may be polymerized or copolymerized in the presence of a ring-opening polymerization catalyst.

The ring-opening polymerization catalyst for use herein may be a catalyst comprising a halide of a metal selected from ruthenium, rhodium, palladium, osmium, indium or platinum, a nitrate or an acetylacetone compound, and a reducing agent; or a catalyst comprising a halide of a metal selected from titanium, palladium, zirconium or molybdenum or an acetylacetone compound, and an organoaluminium compound.

(a3): Hydrogenation Product of Ring-Opening Polymer or Ring-Opening Copolymer:

The hydrogenation product (a3) of a ring-opening polymer or a ring-opening copolymer which is for use in the invention may be obtained by hydrogenating the ring-opening polymer or ring-opening copolymer (a2) obtained in the manner as above, in the presence of a conventional known hydrogenation catalyst.

In the hydrogenation product (a3) of a ring-opening polymer or a ring-opening copolymer, at least a part of the cyclic olefin of formula [I] or [II] may have a repeating unit of the following formula [VII] or [VIII]:

[Chemical 15]

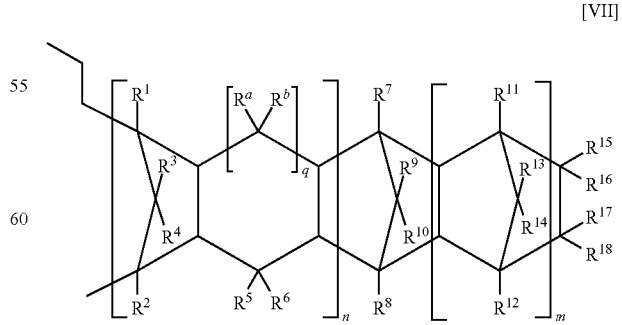

[VII]

In formula [VII], n, m, q, $R^1$ to $R^{18}$, $R^a$ and $R^b$ have the same meanings as in formula [I].

[Chemical 16]

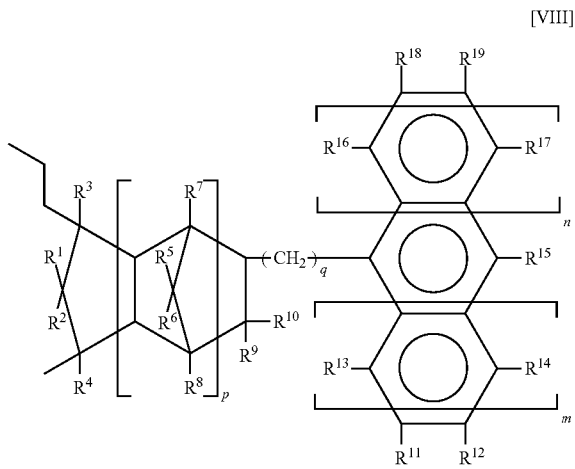

[VIII]

In formula [VIII], n, m, p, q, and $R^1$ to $R^{19}$ have the same meanings as in formula [II].

The hydrogenation product (a3) of a ring-opening polymer or an addition copolymer which is for use in the invention is preferably a hydrogenation polymer of the ring-opening polymer or ring-opening copolymer of the above-mentioned norbornene and its derivative substituted with a hydrocarbon group.

(a4): Graft-Modification Product:

The graft-modification product (a4) is a graft-modification product of the ethylene/cyclic olefin random copolymer (a1), the ring-opening polymer or ring-opening copolymer of a cyclic olefin (a2), or the hydrogenation product of a ring-opening polymer or a ring-opening copolymer (a3) mentioned above.

For the modifying agent, generally used is an unsaturated carboxylic acid. Concretely, it includes unsaturated carboxylic acids such as (meth)acrylic acid, maleic acid, fumaric acid, tetrahydrophthalic acid, itaconic acid, citraconic acid, crotonic acid, isocrotonic acid, endocis-bicyclo[2.2.1]hept-5-ene-2,3-dicarboxylic acid (nadic acid); and derivatives of the unsaturated carboxylic acids such as unsaturated carboxylic acid anhydrides, unsaturated carboxylic acid halides, unsaturated carboxylic acid amides, unsaturated carboxylic acid imides, unsaturated carboxylic ester compounds.

More concretely, the unsaturated carboxylic acid derivatives are maleic anhydride, citraconic anhydride, malenyl chloride, maleimide, monomethyl malate, dimethyl malate, glycidyl malate and so on.

Of those modifying agents, preferred for use herein are α,β-unsaturated dicarboxylic acids and α,β-unsaturated dicarboxylic acid anhydrides, such as maleic acid, nadic acid and their acid anhydrides. Two or more of these modifying agents may be used herein, as combined.

The degree of modification of the graft-modification product (a4) of a cyclic olefin polymer which is for use in the invention is, in general, preferably at most 10 mol %. The graft-modification product (a4) of a cyclic olefin polymer may be produced through graft polymerization in the presence of a modifying agent, or by previously preparing a modification product having a high degree of modification and then mixing the modification product with a non-modified cyclic olefin polymer so as to have a desired degree of modification.

For obtaining the graft-modification product (a4) of a cyclic olefin polymer from a cyclic olefin polymer and a modifying agent, any conventional known method of polymer modification may be widely employed herein. For example, herein employable for obtaining the graft-modification product (a) is a method of adding a modifying agent to a melt of a cyclic olefin polymer for graft polymerization (reaction) of the polymer; or a method of adding a modifying agent to a solution of a cyclic olefin polymer in a solvent for grafting reaction of the polymer.

The grafting reaction may be attained generally at 60 to 350° C. The grafting reaction may also be attained in the presence of a radical initiator such as organic peroxides and azo compounds.

The modification product having a degree of modification as above may be directly obtained through grafting reaction of a cyclic olefin polymer and a modifying agent. It may also be obtained by previously preparing a modification product having a high degree of modification through grafting reaction of a cyclic olefin polymer with a modifying agent and then diluting the modification product with a non-modified cyclic olefin polymer so as to have a desired degree of modification.

In the invention, any of the above-mentioned (a1), (a2), (a3) and (a4) may be used for the cyclic olefin polymer (A) either singly or as combined.

Of those, preferred is the ethylene/cyclic olefin random copolymer (a1), or that is, a random copolymer of ethylene and a cyclic olefin of formula [I] or [III]. The ethylene/cyclic olefin random copolymer (a1) is favorably used since it gives a resin composition having good abrasion resistance.

Preferred examples of the cyclic olefin of formula [I] or [II] that is used as the starting material for the ethylene/cyclic olefin random copolymer (a1) are the above-mentioned tetracyclo[$4.4.0.1^{2,5}.1^{7,10}$]-3-dodecene and its derivatives substituted with a hydrocarbon group, from the viewpoint of the heat resistance and the availability thereof, and tetracyclo [$4.4.0.1^{2,5}.1^{7,10}$]-3-dodecene is an especially preferred example of the compound.

Preferably, the ethylene content of the ethylene/cyclic olefin random copolymer (a1) is from 40 to 85 mol % in view of the heat resistance and the rigidity thereof. More preferably, the ethylene content is at least 50 mol %. Also more preferably, the ethylene content is at most 75 mol %. The cyclic olefin content is preferably from 15 to 60 mol %. More preferably, the cyclic olefin content is at least 25 mol %. Also more preferably, the cyclic olefin content is at most 50 mol %.

The flexible polymer (B) is described. The flexible polymer (B) for use in the invention has a glass transition temperature not higher than 0° C. For sufficiently improving the abrasion resistance of the shaped article obtained herein, the glass transition temperature must be 0° C. or lower, preferably −10° C. or lower, more preferably −20° C. or lower. In general, the glass transition temperature is not lower than −100° C. The degree of crystallinity of the copolymer, as measured through X-ray diffractiometry, is preferably from 0 to 30%, more preferably from 0 to 25%.

Preferably, MFR (melt flow rate: as measured at 230° C. and under a load of 2.16 kg according to ASTM D1238) of the flexible polymer (B) is from 0.01 to 200 g/10 min. If MFR thereof is lower than 0.01 g/10 min, then the melt viscosity of the copolymer may be too high and the melt moldability of the resulting resin composition may worsen. More preferably, MFR is at least 0.05 g/10 min, even more preferably at least 0.1 g/10 min. On the other hand, if MFR is over 200 g/10 min, then the mechanical strength of the resulting shaped article may lower. More preferably, MFR is at most 150 g/10 min, even more preferably at most 100 g/10 min. Also preferably, the intrinsic viscosity [η], as measured in decalin at 135° C., of the copolymer for use herein is preferably from 0.01 to 10 dl/g, more preferably from 0.08 to 7 dl/g.

Preferably, the flexible polymer (B) is a flexible copolymer (b) prepared by polymerizing at least two monomers selected from a group consisting of olefins, dienes and aromatic vinyl-hydrocarbons, and having a glass transition temperature of 0° C. or lower. Using the flexible copolymer (b) composed of these monomers is preferred in view of the affinity thereof to the cyclic olefin polymer (A). Without detracting from the effect of the invention, the copolymer may be copolymerized with a small amount of any other monomer than the above-mentioned monomers.

Preferred examples of the flexible copolymer (b) are the following (b1), (b2), (b3) and (b4):

(b1): an amorphous or low-crystalline flexible copolymer prepared by polymerizing at least two monomers selected from a group consisting of ethylene and an α-olefin having from 3 to 20 carbon atoms, (b2): a flexible copolymer prepared by polymerizing ethylene, an α-olefin having from 3 to 20 carbon atoms, and a cyclic olefin, (b3): a flexible copolymer prepared by polymerizing a non-conjugated diene, and at least two monomers selected from ethylene and an α-olefin having from 3 to 20 carbon atoms, (b4): a flexible copolymer of a random or block copolymer or its hydrogenation product of an aromatic vinyl-hydrocarbon and a conjugated diene.

The flexible copolymer (b1) is an amorphous or low-crystalline flexible copolymer prepared by polymerizing at least two monomers selected from a group consisting of ethylene and an α-olefin having from 3 to 20 carbon atoms. Of the above (b1) to (b4), the flexible copolymer (b1) is especially favorably used herein in view of the affinity thereof to the cyclic olefin polymer (A).

The flexible copolymer (b1) is amorphous or low-crystalline and has a glass transition temperature of not higher than 0° C., and therefore it is soft and flexible. Preferably, its density is from 0.85 to 0.91 g/cm$^3$, more preferably from 0.85 to 0.90 g/cm$^3$.

The flexible copolymer (b1) is prepared by polymerizing at least two olefins, and is generally a random copolymer. Concretely, ethylene/α-olefin copolymers and propylene/α-olefin copolymers and so on are usable for it. Without detracting from the object of the invention, it may contain, if desired, any other copolymerizable unsaturated monomer component.

The starting material, α-olefin for the ethylene/α-olefin copolymers may be an α-olefin having from 3 to 20 carbon atoms, and its examples are propylene, 1-butene, 1-pentene, 1-hexene, 4-methyl-1-pentene, 1-octene, 1-decene and their mixtures. Of those, especially preferred are α-olefins having from 3 to 10 carbon atoms. Above all, ethylene/propylene copolymer is favorable in view of the affinity thereof to the cyclic olefin polymer (A). The molar ratio of ethylene to α-olefin (ethylene/α-olefin) in the ethylene/α-olefin copolymer varies, depending on the type of the α-olefin therein, but is preferably from 30/70 to 95/5. The molar ratio (ethylene/α-olefin) is more preferably not less than 50/50, and more preferably not more than 90/10.

The starting material, α-olefin for the propylene/α-olefin copolymers may be an α-olefin having from 4 to 20 carbon atoms, and its examples are 1-butene, 1-pentene, 1-hexene, 4-methyl-1-pentene, 1-octene, 1-decene and their mixtures. Of those, especially preferred are α-olefins having from 4 to 10 carbon atoms. The molar ratio of propylene to α-olefin (propylene/α-olefin) in the propylene/α-olefin copolymer varies, depending on the type of the α-olefin therein, but is preferably from 30/70 to 95/5. The molar ratio (propylene/α-olefin) is more preferably not less than 50/50, and more preferably not more than 90/10.

The flexible copolymer (b2) is a flexible copolymer prepared by polymerizing ethylene, an α-olefin having from 3 to 20 carbon atoms, and a cyclic olefin. The flexible copolymer (b2) is prepared by polymerizing at least three olefins, and is generally a random copolymer. Without detracting from the object of the invention, it may contain, if desired, any other copolymerizable unsaturated monomer component.

Concretely, examples of the starting material, α-olefin having from 3 to 20 carbon atoms for the flexible copolymer (b2) are propylene, 1-butene, 4-methyl-1-pentene, 1-hexene, 1-octene, 1-decene, 1-dodecene, 1-tetradecene, 1-hexadecene, 1-octadecene, 1-eicosene. One or more of these may be used herein. The starting material, cyclic olefin for the flexible copolymer (b2) may be the same as that used as the starting material for the cyclic olefin polymer (A).

The flexible copolymer (b2) is prepared by copolymerizing the monomers preferably in a ratio of from 40 to 98 mol %, more preferably from 50 to 90 mol % of ethylene, from 2 to 50 mol %, more preferably from 5 to 40 mol % of the other α-olefin, from 2 to 20 mol %, more preferably from 2 to 15 mol % of a cyclic olefin. This is a substantially linear random copolymer in which the constitutional units derived from these monomers are randomly configured. The substantially linear structure of the flexible copolymer (b2) not having a gel-like crosslinked structure is confirmed by the fact that the copolymer completely dissolves in decalin at 135° C. The flexible copolymer (b2) may be produced by suitably selecting the condition for it according to the same method as that for the cyclic olefin polymer (A).

The flexible copolymer (b3) is a flexible copolymer prepared by polymerizing a non-conjugated diene, and at least two monomers selected from ethylene and an α-olefin having from 3 to 20 carbon atoms. The flexible copolymer (b3) is prepared by polymerizing at least one non-conjugated diene and at least two olefins, and is generally a random copolymer. Concretely, ethylene/α-olefin/diene copolymer rubber and propylene/α-olefin/diene copolymer rubber and so on are usable for it. Without detracting from the object of the invention, the copolymer may contain, if desired, any other copolymerizable unsaturated monomer component.

Alpha-olefin to constitute the ethylene/α-olefin/diene copolymer rubber may be an α-olefin having from 3 to 20 carbon atoms, and its examples are propylene, 1-butene, 1-pentene, 1-hexene, 4-methyl-1-pentene, 1-octene, 1-decene and their mixtures. Of those, especially preferred are α-olefins having from 3 to 10 carbon atoms. The molar ratio of ethylene to α-olefin (ethylene/α-olefin) in the ethylene/α-olefin/diene copolymer rubber varies, depending on the type of the α-olefin therein, but is preferably from 30/70 to 95/5.

Alpha-olefin to constitute the propylene/α-olefin/diene copolymer rubber may be an α-olefin having from 4 to 20 carbon atoms, and its examples are 1-butene, 1-pentene, 1-hexene, 4-methyl-1-pentene, 1-octene, 1-decene and their mixtures. Of those, especially preferred are α-olefins having from 4 to 10 carbon atoms. The molar ratio of propylene to α-olefin (propylene/α-olefin) in the propylene/α-olefin/diene copolymer rubber varies, depending on the type of the α-olefin therein, but is preferably from 30/70 to 95/5.

Examples of the diene component in the ethylene/α-olefin/diene copolymer rubber and the propylene/α-olefin/diene copolymer rubber are linear non-conjugated dienes such as 1,4-hexadiene, 1,6-octadiene, 2-methyl-1,5-hexadiene, 6-methyl-1,5-heptadiene, 7-methyl-1,6-octadiene; cyclohexadiene, dicyclopentadiene; cyclic non-conjugated dienes such as methyltetrahydroindene, 5-vinylnorbornene, 5-ethylidene-2-norbornene, 5-methylene-2-norbornene, 5-isopropylidene-2-norbornene, 6-chloromethyl-5-isopropenyl-2-norbornene; 2,3-diisopropylidene-5-norbornene; 2-ethylidene-3-isopropylidene-5-norbornene; 2-propenyl-2,2-norbornadiene. Preferably, the content of the diene component in the copolymer is from 1 to 20 mol %, more preferably from 2 to 15 mol %.

The flexible copolymer (b4) is a random or block copolymer or its hydrogenation product of an aromatic vinyl-hydrocarbon and a conjugated diene.

For the flexible copolymer (b4), concretely used are styrene-butadiene block copolymer rubber, styrene-butadiene-styrene block copolymer rubber, styrene-isoprene block copolymer rubber, styrene-isoprene-styrene block copolymer rubber, hydrogenated styrene-butadiene-styrene block copolymer rubber, hydrogenated styrene-isoprene-styrene block copolymer rubber, styrene-butadiene random copolymer rubber.

In the flexible copolymer (b4), in general, the molar ratio of the aromatic vinyl-hydrocarbon to the conjugated diene (aromatic vinyl-hydrocarbon/conjugated diene) is preferably from 10/90 to 70/30. The hydrogenated styrene-butadiene-styrene block copolymer rubber is a copolymer rubber prepared by hydrogenating a part or all of the double bonds remaining in a styrene-butadiene-styrene block copolymer rubber. The hydrogenated styrene-isoprene-styrene block copolymer rubber is a copolymer rubber prepared by hydrogenating a part or all of the double bonds remaining in a styrene-isoprene-styrene block copolymer rubber.

One or more of the above-mentioned flexible copolymers (b1), (b2), (b3) and (b4) may be used herein either singly or as combined.

The radical initiator (C) may be any one capable of generating a radical through thermal decomposition under heat during melt kneading, and its type is not specifically defined. It includes peroxides, azo compounds and redox initiators. Of those, preferably employed herein are organic peroxides in view of their reactivity, good handlability and availability. Preferably, the radical initiator (C) decomposes at a suitable speed during melt kneading, and its temperature at which the half-value period becomes one minute is preferably from 30 to 250° C. The temperature at which the half-value period becomes one minute is more preferably not less than 50° C., and more preferably not more than 200° C.

Organic peroxides usable for the radical initiator (C) include ketone peroxides such as methyl ethyl ketone peroxide, cyclohexanone peroxide; peroxyketals such as 1,1-bis(t-butylperoxy)cyclohexane, 2,2-bis(t-butylperoxy)octane; hydroperoxides such as t-butylhydroperoxide, cumemehydroperoxide, 2,5-dimethylhexane-2,5-dihydroxyperoxide, 1,1,3,3-tetramethylbutylhydroperoxide; dialkyl peroxides such as di-t-butyl peroxide, 2,5-dimethyl-2,5-bis(t-butylperoxy)hexane, 2,5-dimethyl-2,5-bis(t-butylperoxy)hexyne-3; diacyl peroxides such as lauroyl peroxide, benzoyl peroxide; peroxyesters such as t-butylperoxy acetate, t-butylperoxy benzoate, 2,5-dimethyl-2,5-bis(benzoylperoxy)hexane.

The resin composition produced by the method of the invention is prepared by melt-kneading a cyclic olefin polymer (A), a flexible polymer (B) and a radical initiator (C). In this case, a polyfunctional compound (D) having at least two radical-polymerizable functional groups in the molecule may be added to these materials and melt-kneaded to attain more efficient crosslinking. Accordingly, the abrasion resistance of the shaped article may be improved.

The polyfunctional compound (D) having at least two radical-polymerizing functional groups in the molecule includes, for example, divinylbenzene, vinyl acrylate, vinyl methacrylate, triallyl isocyanurate, diallyl phthalate, ethylene dimethacrylate, trimethylolpropane triacrylate.

Preferably in the production method of the invention, 100 parts by weight of a cyclic olefin polymer (A), from 1 to 150 parts by weight of a flexible polymer (B) and from 0.001 to 1 part by weight of a radical initiator (C) are melt-kneaded.

Preferably, the amount of the flexible polymer (B) is from 1 to 150 parts by weight relative to 100 parts by weight of the cyclic olefin polymer (A). When the amount of the flexible polymer (B) is smaller than 1 part by weight, then the abrasion resistance of the resin article could not be improved sufficiently; and the amount is more preferably at least 5 parts by weight. On the other hand, when the amount of the flexible polymer (B) is larger than 150 parts by weight, then the rigidity of the resulting shaped article may be low. More preferably, the amount is at most 125 parts by weight.

The amount of the radical initiator (C) is preferably from 0.001 to 1 part by weight relative to 100 parts by weight of the cyclic olefin polymer (A). If the amount of the radical initiator (C) is smaller than 0.001 parts by weight, then the crosslinking reaction could not sufficiently go on and the abrasion resistance of the shaped article could not be improved sufficiently. More preferably, the amount is at least 0.01 parts by weight. On the other hand, if the amount of the radical initiator (C) is larger than 1 part by weight, then the durability of the shaped article may worsen. Preferably, the amount is at most 0.5 parts by weight.

The amount of the polyfunctional compound (D) is preferably from 0 to 1 part by weight relative to 100 parts by weight of the cyclic olefin polymer (A). The polyfunctional compound (D) is an optional ingredient, and it may be or may not be added to the composition. For efficiently attaining the crosslinking reaction, the compound is preferably added to the composition. In that case, the preferred amount of the compound to be in the composition is at least 0.001 parts by weight, more preferably at least 0.01 parts by weight. On the other hand, however, if the amount of the polyfunctional compound (D) is larger than 1 part by weight, then the durability of the shaped article may worsen. Preferably, the amount is at most 0.5 parts by weight.

In the production method of the invention, a filler may be further melt-kneaded with the composition. Not specifically defined, the filler may be a fibrous filler including carbon fibers, glass fibers, synthetic fibers and whiskers, or may be a granular filler including carbon black, calcium carbonate, talc, clay, mica, silica, alumina and titania. Apart from the filler, the composition may further contain heat-resistant stabilizer, weather-resistant stabilizer, antistatic agent, slipping agent, antiblocking agent, antifogging agent, lubricant, dye, pigment, natural oil, synthetic oil, wax, and organic or inorganic filler.

From the above-mentioned starting materials, a resin composition is produced. In the invention, a cyclic olefin polymer (A) and a flexible polymer (B) are melt-kneaded at a temperature at which a radical initiator (C) decomposes, whereupon the two may undergo crosslinking reaction to give a resin composition having good abrasion resistance.

In this, it is important that a part of a cyclic olefin polymer (A) is previously melt-kneaded with a flexible polymer (B) and a radical initiator (C), and then the remaining cyclic olefin polymer (A) is added thereto and melt-kneaded. The cyclic olefin polymer (A) is divided into two portions and added separately at two times, and accordingly, the mixture of the cyclic olefin polymer (A) having a crosslinked structure and the flexible polymer (B) may be diluted with the cyclic olefin polymer (A) not having a crosslinked structure, and the increase in the melt viscosity of the resin composition may be thereby prevented. Even though the composition is diluted in that manner, its abrasion resistance can be fully improved.

Not specifically defined, the ratio of the amount of the cyclic olefin polymer (A) to be added previously to the amount thereof to be added later (previous addition/later addition) is preferably from 1/99 to 70/30. If the ratio (previous addition/later addition) is smaller than 1/99, then the abrasion resistance of the resin composition may lower. More preferably, the ratio is at least 5/95. On the other hand, if the ratio (previous addition/later addition) is larger than 70/30, then the effect of preventing the increase in the melt viscosity of the resin composition may lower. More preferably, the ratio is at least 50/50.

When these ingredients are mixed, a part of a cyclic olefin polymer (A) may be melt-kneaded with a flexible polymer (B) and a radical initiator (C) all at a time, and then the remaining cyclic olefin polymer (A) may be added thereto and melt-kneaded. However, it is desirable that a part of a cyclic olefin polymer (A) is previously melt-kneaded with a flexible polymer (B), then a radical initiator (C) is added thereto and melt-kneaded, and subsequently the remaining cyclic olefin polymer (A) is added thereto and melt-kneaded. This is because it is desirable to start the crosslinking reaction in the condition where a part of a cyclic olefin polymer (A) and a flexible polymer (B) are well blended for obtaining a resin composition having good dispersibility.

The cyclic olefin polymer (A), the flexible polymer (B) and the radical initiator (C) may be melt-kneaded at any temperature at which the cyclic olefin polymer (A) and the flexible polymer (B) can melt and the radical initiator (C) can decompose. Concretely, the temperature is preferably from 150 to 350° C. For more efficiently promoting the crosslinking reaction, the kneading temperature is preferably not lower than 200° C. For preventing any excess thermal decomposition of the resin, the kneading temperature is preferably not higher than 300° C. It is desirable to use a radical initiator (C) having a half-value period of not longer than 1 minute at the kneading temperature.

The apparatus for melt-kneading is not specifically defined. Various melt-kneading apparatus may be used herein, including, for example, a single-screw extruder, a twin-screw extruder, a roll, a Banbury mixer. Above all, preferably used is an extruder, especially a multi-screw extruder such as twin-screw extruder that enables sufficient kneading. When an extruder is used, it is desirable that not only a regular screw but also a kneading disc or a reverse screw is disposed therein to improve the kneading power thereof. Thus melt-kneaded, the resin composition may be directly molded as it is, or may be once pelletized and then melt-kneaded.

When the cyclic olefin polymer (A), the flexible polymer (B) and the radical initiator (C) are reacted, generation of decomposition products derived from the radical initiator and the resin is inevitable. Some of such decomposition products are volatile, and in consideration of the contamination resistance of the shaped articles and of the odor that may be generated by them, it is desirable to effectively remove them. Accordingly, when the cyclic olefin polymer (A), the flexible polymer (B) and the radical initiator (C) are melt-kneaded, then it is desirable to use an extruder having a vent. In that manner, the volatile components may be removed through the vent. The type of the vent is not specifically defined. It may be a vent open to the air or may be a pressure-reducing vent. In this case, when a multi-screw extruder such as twin-screw extruder is used, then it enables sufficient kneading and improves the efficiency of removing volatile components.

Preferably, the melting time after the addition of the radical initiator (C) is from 30 to 1800 seconds. The time means an overall time after the addition of the radical initiator (C) to the system and before the production of a shaped article, for which the ingredients are melt-kneaded. If the kneading time is too short, then the crosslinking reaction could not go on and the removal of volatile components may be unsatisfactory. More preferably, the time is not shorter than 60 seconds, even more preferably not shorter than 120 seconds. On the other hand, if the kneading time is too long, then the production efficiency may lower. More preferably, the time is not longer than 1500 seconds, even more preferably not longer than 1200 seconds. When an extruder is used for kneading the ingredients, the kneading time corresponds to the time for which the melt stays in the extruder. Accordingly, when two extruders are used, then the time is a total of the residence time of the two. On the other hand, when one extruder is used and a radical initiator (C) is added thereto during the kneading process therein, then the time means the residence time taken to pass through the downstream zone after the addition. The residence time may be calculated by dividing the inner capacity of the extruder used by the injection speed.

Preferably, MFR (as measured at 230° C. and under a load of 2.16 kg according to ASTM D1238) of the resin composition thus obtained is from 0.01 to 100 g/10 min. If MFR thereof is lower than 0.01 g/10 min, then the resin composition may be difficult to be melt-molded, especially to be injection-molded. More preferably, MFR is at least 0.05 g/10 min, even more preferably at least 0.2 g/10 min. On the other hand, if MFR is higher than 100 g/10 min, then the strength and the abrasion resistance of the shaped article may lower. More preferably, MFR is at least 80 g/10 min, even more preferably at least 60 g/10 min.

Thus obtained, the resin composition is melt-molded to give a shaped article. The molding method is not specifically defined, for which, however, preferred is injection-molding that takes advantage of the good melt flowability of the composition. In particular, the resin composition produced according to the method of the invention is favorably used in injection molding at high speed, or in injection molding to give large-size articles, or in injection molding to give articles that require severe dimensional accuracy.

EXAMPLES

The invention is described in more detail with reference to the following Examples. In the Examples, samples were analyzed and evaluated according to the methods mentioned below.

(1) Glass Transition Temperature:

A sample is heated at a heating speed of 10° C./min and its DSC curve is drawn. At around the glass transition temperature on the curve, an inflection point appears to give a step-like temperature profile. In this, the point at which the straight line that is at the same distance in the vertical direction from the extended line from each base line crosses the DSC curve is referred to as an intermediate glass transition temperature. The point at which the straight line extended from the base line on the low-temperature side to the high-temperature side crosses the tangential line drawn to the maximum inclination point of the step-like temperature profile of the curve is referred to as a glass transition-starting temperature. The point at which the straight line extended from the base line on the high-temperature side to the low-temperature side crosses the tangential line drawn to the maximum inclination point of the step-like temperature profile of the curve is referred to as a glass transition-ending temperature. In this, the glass transition-starting temperature is used as a glass transition temperature.

(2) Taber's Abrasion Amount:

A sample of a rectangular injection-molded article having a length of 130 mm, a width of 120 mm and a thickness of 2 mm is tested for the abrasion amount thereof according to JIS K7204. The abrasion tester is manufactured by Toyo Tester Kogyo; the abrasion ring is CS17; the load is 1000 g (each arm 500 g); the number of rotation is 1000.

Example 1

Materials (A) to (D) used in this Example are as follows:
Cyclic Olefin Polymer (A):

Random copolymer of ethylene and tetracyclo[$4.4.0.1^{2,5}.1^{7,10}$]-3-dodecene (hereinafter it may be abbreviated to "TCD-3"). As measured through $^{13}$C-NMR, its ethylene content is 62 mol %; as measured in decalin at 135° C., its intrinsic viscosity [η] is 0.60 dl/g; and its glass transition temperature (Tg) is 105° C. As measured at 230° C., its MFR (under a load of 2.16 kg according to ASTM D1238) is 8.2 g/10 min. The structural formula of TCD-3 is shown below.

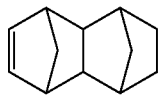

[Chemical 17]

Flexible Polymer (B):

Ethylene/propylene random copolymer "P-0880" manufactured by Mitsui Kagaku. Its ethylene content is 80 mol %; its glass transition temperature (Tg) is −54° C.; its MFR (as measured at 230° C. and under a load of 2.16 kg according to ASTM D1238) is 0.4 g/10 min; its [η] is 2.5 dl/g; its density is 0.867 g/cm$^3$; and its degree of crystallinity as measured through X-ray diffractiometry is about 10%.

Radial Initiator (C):

"Perhexyne 25B" manufactured by Nippon Yushi. Its main ingredient (at least 90%) is 2,5-dimethyl-2,5-bis(t-butylperoxy)hexyne-3. Its temperature at which the half-value period becomes one minute is 194.3° C.

Polyfunctional Compound (D):

Divinylbenzene.

2 kg of ethylene/TCD-3 random copolymer pellets and 2 kg of ethylene/propylene random copolymer pellets were well mixed, then melt-blended in a twin-screw extruder ("PCM 45" manufactured by Ikegai Tekko) at a cylinder temperature of 220° C., and then pelletized through a pelletizer into pellets (a).

The twin-screw extruder used herein has L/D of 42, and has a vent at two sites, at around the center and the tip of the cylinder. The two vents are both open to the air. The screw constitution is mainly a regular screw, but before and after the vent at around the center, a kneading disc is disposed. The mean residence time for which the fed resin stays in the extruder until it is extruded out is about 3 minutes.

To 4 kg of the above pellets (a), added were 4 g of "Perhexyne 25B" and 4 g of divinylbenzene, and well mixed. The mixture was put into the above-mentioned twin-screw extruder, "PCM 45" (cylinder temperature, 230° C.), and melt-kneaded and reacted, and then pelletized through a pelletizer into pellets (b).

4 kg of the above pellets (b) and 16 kg of ethylene/TCD-3 random copolymer pellets were well mixed, then melt-blended in the above-mentioned twin-screw extruder "PCM 45" at a cylinder temperature 220° C., and pelletized through a pelletizer into pellets (c).

Thus obtained, the pellets (c) are of a mixture prepared by melt-kneading 100 parts by weight of a cyclic olefin polymer (A), 11 parts by weight of a flexible polymer (B), 0.022 parts by weight of a radical initiator (C) and 0.0022 parts by weight of a polyfunctional compound (D). Of 100 parts by weight of the cyclic olefin polymer (A), 11 parts by weight thereof was previously kneaded, and 89 parts by weight thereof was added and kneaded later. MFR of the pellets (c) (as measured at 230° C. and under a load of 2.16 kg according to ASTM D1238) was 4 g/10 min. The pellets (c) were injection-molded to give a rectangular molded article having a length of 130 mm, a width of 120 mm and a thickness of 2 mm, and the Taber's abrasion amount thereof was determined. It was 9.5 mm$^3$. The load deformation temperature of the article, as measured under a load of 1.82 MPa according to ASTM D648, was 94° C. The blend ratio of the starting materials and the test results are all shown in Table 1.

Comparative Example 1

18 kg of ethylene/TCD-3 random copolymer pellets and 2 kg of ethylene/propylene random copolymer pellets were well mixed, then melt-blended in the same twin-screw extruder ("PCM 45" manufactured by Ikegai Tekko) as in Example 1, at a cylinder temperature of 220° C., and then pelletized through a pelletizer into pellets (d). MFR (as measured at 230° C. under a load of 2.16 kg according to ASTM D1238) of the pellets (d) was 1.6 g/10 min.

To 20 kg of the pellets (d), added were 4 g of "Perhexyne 25B" and 4 g of divinylbenzene, and well mixed. The mixture was put into the above-mentioned twin-screw extruder "PCM 45" (cylinder temperature, 230° C.), and melt-kneaded and reacted, and then pelletized through a pelletizer to give pellets (e). MFR (as measured at 230° C. under a load of 2.16 kg according to ASTM D1238) of the pellets (e) was 0.1 g/10 min. The pellets (e) were injection-molded in the same manner as in Example 1, and the molded articles were tested for the Taber's abrasion amount. It was 8.4 mm$^3$. The blend ratio of the starting materials and the test results are all shown in Table 1.

Comparative Example 2

The pellets (d) prepared in Comparative Example 1 were injection-molded in the same manner as in Example 1, and the molded articles were tested for the Taber's abrasion amount. It was 21.7 mm$^3$. The blend ratio of the starting materials and the test results are all shown in Table 1.

Comparative Example 3

Ethylene/TCD-3 random copolymer was injection-molded in the same manner as in Example 1, and the molded articles were tested for the Taber's abrasion amount. It was 23.7 mm$^3$. The blend ratio of the starting materials and the test results are all shown in Table 1.

TABLE 1

| | Cyclic Olefin Polymer (A) | | Flexible Copolymer (B) (wt. pt.) | Radical Initiator (C) (wt. pt.) | Polyfunctional Compound (D) (wt. pt.) | MFR (230° C.) (g/10 min) | Taber's Abrasion Amount (mm³) |
|---|---|---|---|---|---|---|---|
| | previous addition (wt. pt.) | Later addition (wt. pt.) | | | | | |
| Example 1 | 11 | 89 | 11 | 0.022 | 0.022 | 4 | 9.5 |
| Comparative Example 1 | 100 | | 11 | 0.022 | 0.022 | 0.1 | 8.4 |
| Comparative Example 2 | 100 | | 11 | 0 | 0 | 1.6 | 21.7 |
| Comparative Example 3 | 100 | | 0 | 0 | 0 | 8.2 | 23.7 |

As in Table 1, the shaped article of the resin composition obtained according to the production method of the invention (Example 1) has good abrasion resistance. As opposed to it, the abrasion resistance of the shaped article formed of a cyclic olefin polymer (A) alone (Comparative Example 3) is significantly poor. It is further understood that the abrasion resistance of the shaped article of the resin composition prepared by melt-kneading a cyclic olefin polymer (A) and a flexible polymer (B) not adding a radical initiator (C) and a polyfunctional compound (D) thereto (Comparative Example 2) is also significantly poor. The Taber's abrasion amount of the shaped article obtained according to the production method of the invention is almost on the same level as that of the article of the composition prepared by mixing the cyclic olefin polymer (A) all at a time (Comparative Example 1).

The resin composition obtained according to the production method of the invention (Example 1) has MFR that is much higher than that of the resin composition prepared by mixing the cyclic olefin polymer (A) all at a time (Comparative Example 1). Though MFR of the resin composition of the invention lowers as compared with that of the starting material, cyclic olefin polymer (A) (Comparative Example 3), but it is understood that the resin composition still has good melt flowability. Specifically, the resin composition obtained according to the production method of the invention has much improved abrasion resistance as compared with a cyclic olefin polymer (A) and its melt flowability lowers little.

The invention claimed is:

1. A method for producing a resin composition by melt-kneading a cyclic olefin polymer (A) having a glass transition temperature of from 60 to 200° C. and a flexible polymer (B) having a glass transition temperature of 0° C. or lower, wherein a part of the cyclic olefin polymer (A) is previously melt-kneaded with the flexible polymer (B) and a radical initiator (C) and then the remaining cyclic olefin polymer (A) is added thereto and melt-kneaded, wherein a polyfunctional compound (D) having at least two radical-polymerizable functional groups in the molecule is added along with the radical initiator (C).

2. The method for producing a resin composition as claimed in claim 1, wherein the cyclic olefin polymer (A) is a polymer prepared by polymerizing a cyclic olefin of the following formula [I] or [II]:

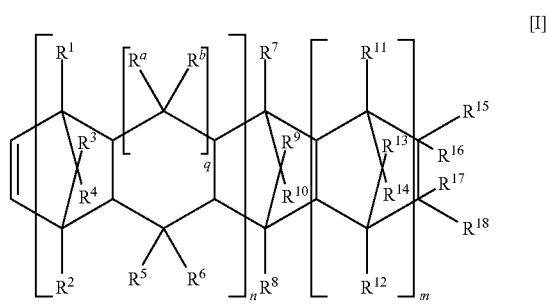

[I]

wherein n indicates 0 or 1; m indicates 0 or a positive integer; q indicates 0 or 1; $R^1$ to $R^{18}$ and $R^a$ and $R^b$ each independently represent a hydrogen atom, a halogen atom or a hydrocarbon group; $R^{15}$ to $R^{18}$ may bond to each other to form a monocyclic or polycyclic structure, and the monocyclic or polycyclic structure may have a double bond; and $R^{15}$ and $R^{16}$, or $R^{17}$ and $R^{18}$ may form an alkylidene group,

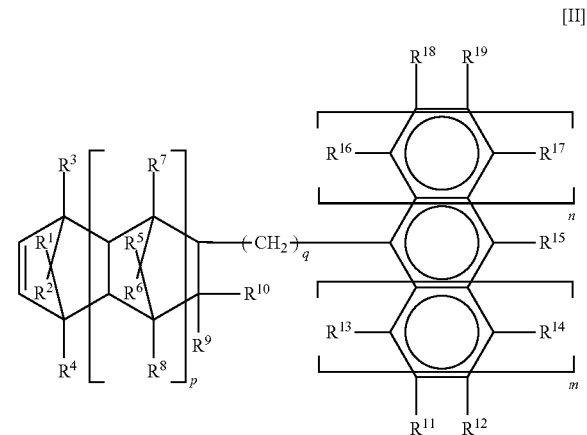

[II]

wherein p and q each indicate 0 or an integer of 1 or more; m and n each indicate 0, 1 or 2; $R^1$ to $R^{19}$ each independently represent a hydrogen atom, a halogen atom, an aliphatic hydrocarbon group, an alicyclic hydrocarbon group, an aromatic hydrocarbon group, or an alkoxy group; the carbon atom to which $R^9$ (or $R^{10}$) bonds, and the carbon atom to which $R^{13}$ or $R^{11}$ bonds may bond to each other directly or via an alkylene group having from 1 to 3 carbon atoms; and when n=m=0, $R^{15}$ and $R^{12}$, or $R^{15}$ and $R^{19}$ may bond to each other to form a monocyclic or polycyclic aromatic ring.

3. The method for producing a resin composition as claimed in claim 2, wherein the cyclic olefin polymer (A) is a random copolymer of ethylene and a cyclic olefin of formula [I] or [II].

4. The method for producing a resin composition as claimed in claim 1, wherein MFR (as measured at 230° C. and under a load of 2.16 kg according to ASTM D1238) of the cyclic olefin polymer (A) is from 0.1 to 500 g/10 min.

5. The method for producing a resin composition as claimed in claim 1, wherein the flexible polymer (B) is a flexible copolymer (b) prepared by polymerizing at least two monomers selected from a group consisting of olefins, dienes and aromatic vinyl-hydrocarbons, and having a glass transition temperature of 0° C. or lower.

6. The method for producing a resin composition as claimed in claim 5, wherein the flexible copolymer (b) is at least one copolymer selected from a group consisting of:
- an amorphous or low-crystalline flexible copolymer (b1) prepared by polymerizing at least two monomers selected from a group consisting of ethylene and an α-olefin having from 3 to 20 carbon atoms,
- a flexible copolymer (b2) prepared by polymerizing ethylene, an α-olefin having from 3 to 20 carbon atoms, and a cyclic olefin,
- a flexible copolymer (b3) prepared by polymerizing a non-conjugated diene, and at least two monomers selected from ethylene and an α-olefin having from 3 to 20 carbon atoms, and
- a flexible copolymer (b4) of a random or block copolymer or its hydrogenation product of an aromatic vinyl-hydrocarbon and a conjugated diene.

7. The method for producing a resin composition as claimed in claim 6, wherein the flexible copolymer (b) is an amorphous or low-crystalline flexible copolymer (b1) prepared by polymerizing at least two monomers selected from a group consisting of ethylene and an α-olefin having from 3 to 20 carbon atoms.

8. The method for producing a resin composition as claimed in claim 1, wherein 100 parts by weight of the cyclic olefin polymer (A), from 1 to 150 parts by weight of the flexible polymer (B) and from 0.001 to 1 part by weight of the radical initiator (C) are melt-kneaded.

9. The method for producing a resin composition as claimed in claim 8, wherein the ratio of the amount of the cyclic olefin polymer (A) added previously to that added later (previous addition/later addition) is from 1/99 to 70/30.

10. The method for producing a resin composition as claimed in claim 1, wherein a part of the cyclic olefin polymer (A) is previously melt-kneaded with the flexible polymer (B), then the radical initiator (C) is added thereto and melt-kneaded, and subsequently the remaining cyclic olefin polymer (A) is added thereto and melt-kneaded.

11. The method for producing a resin composition as claimed in claim 1, wherein from 0.001 to 1 part by weight of the polyfunctional compound (D) is melt-kneaded relative to 100 parts by weight of the cyclic olefin polymer (A).

12. The method for producing a resin composition as claimed in claim 1, wherein the melt-kneading temperature is from 150 to 350° C.

13. The method for producing a resin composition as claimed in claim 1, wherein the ingredients are melt-kneaded in an extruder having a vent.

14. The method for producing a resin composition as claimed in claim 1, wherein the kneading time after the addition of the radical initiator (C) is from 30 to 1800 seconds.

15. The method for producing a resin composition as claimed in claim 1, wherein MFR (as measured at 230° C. and under a load of 2.16 kg according to ASTM D1238) of the resin composition is from 0.01 to 100 g/10 min.

16. A method for producing a shaped article by injection-molding the resin composition produced according to the production method of claim 1.

* * * * *